United States Patent [19]

Gramlich et al.

[11] Patent Number: 5,581,697
[45] Date of Patent: Dec. 3, 1996

[54] METHOD AND APPARATUS FOR RUN-TIME ERROR CHECKING USING DYNAMIC PATCHING

[75] Inventors: Wayne C. Gramlich, Sunnyvale; Achut Reddy, San Jose; Shyam Desirazu, Foster City, all of Calif.

[73] Assignee: Sun Microsystems, Inc., Mountain View, Calif.

[21] Appl. No.: 189,089

[22] Filed: Jan. 28, 1994

[51] Int. Cl.$^6$ .......................... G01R 31/28; G06F 11/00
[52] U.S. Cl. .................................................. 395/183.11
[58] Field of Search .......................... 395/575, 183.11, 395/183.18, 183.08; 371/19

[56] References Cited

U.S. PATENT DOCUMENTS

| | | | |
|---|---|---|---|
| 5,029,078 | 7/1991 | Iwai | 364/200 |
| 5,193,180 | 3/1993 | Hastings | 395/183.11 |
| 5,243,603 | 9/1993 | Broeren | 371/27 |
| 5,335,344 | 8/1994 | Hastings | 395/183.11 |
| 5,404,499 | 4/1995 | Nichols et al. | 395/575 |

OTHER PUBLICATIONS

"Adding Run–Time Checking to the Portable C Compiler," Steffen, Joseph L., AT & T Laboratories, Software—Practice and Experience, vol. 22(4), Apr. 1992, pp. 305–316.
"A Flexible Measurement Tool for Software Systems," Deutsch, et al., Information Processing 71, North–Holland Publishing Company, 1972, pp. 320–326.
"A Practical System for Intermodule Code Optimization at Link–Time," Srivastava, et al., Digital Equipment Corporation Western Research Laboratory, Dec. 1992, pp. 1–23.
"Bcc: Runtime Checking for C Programs," Kendall, Samuel C., Delf Consulting Corporation, USENIX Toronto Conference Proceedings, Summer 1983, Software Tools, pp. 6–16.
"Debugging with Lightweight Instrumentation," Chase, et al., Rice University, Supercomputer Debugging Workshop Proceedings, Nov. 1991, pp. 1–8.
"Design and Implementation of a Diagnostic Compiler for PL/I," Conway, et al., Cornell University, Communications of the ACM, vol. 17, No. 3, Mar. 1973, pp. 169–179.
"Efficient Debugging Primitives for Multiprocessors," Aral et al., Encore Computer Corporation, Marlborough, MA 01752–3004, pp. 87–93.
"Error Checking, Tracing, and Dumping in an ALGOL 68 Checkout Compiler," Thompson, C. M., University of Alberta, Edmonton, Canada, SIGPLAN Notices, Jul. 1977, pp. 106–111.

(List continued on next page.)

*Primary Examiner*—Robert W. Beausoliel, Jr.
*Assistant Examiner*—Glenn Snyder
*Attorney, Agent, or Firm*—Erwin J. Basinski

[57] ABSTRACT

The invention provides a method and apparatus for dynamic patching for run-time error checking. With the present invention, a program to be error checked is read into memory where a debugging module resides. Such in-memory copy of the program is scanned for load objects. The load objects comprise libraries used by the program being error checked, as well as the main routines of such program. Next, a list of patch sites in the load objects is created and these patch sites corresponds to address locations in the load objects to be patched. Address space is then allocated for sections of the patch area where calls to real checking code resides. Finally, patches are written out to the in-memory copy of the program to be error checked. The original instruction in a patch site is replaced with branch to patch area instruction and the original instruction displaced is stored in the patch site's corresponding section of the patch area. The call to real checking code in this section of the patch area calls an error checking code. After the error checking is complete, the process transfers from the patch area to the next instruction in the segment of load object that was patched. In addition, the present invention is able to load new load objects. Such new load objects are scanned and the aforementioned patching process is repeated for patching the new load objects.

12 Claims, 3 Drawing Sheets

OTHER PUBLICATIONS

"Experience with a Software-Defined Machine Architecture," Wall, David W., Digital Equipment Corporation, ACM Transactions on Programming Languages and Systems, vol. 14, No. 3, Jul. 1992, pp. 299-338.

"Fast Breakpoints: Design and Implementation" Kessler, Peter B., Xerox PARC, ACM SIGPLAN Conference Proceedings on Programming Language Design and Implementation, Jun. 1990, pp. 78-84.

"Integral C-A Practical Environment for C Programming," Ross, Graham, CASE Division, Tektronix, Inc., ACM SIGPLAN, Jul. 1986, pp. 42-48.

"Global Register Allocation at Link Time," Wall, David W., Digital Equipment Corporation Western Research Laboratory, 1986, pp. 264-275.

"Link-Time Code Modification," Wall, David W., Digital Equipment Corporation Western Research Laboratory, WRL Research Report 89/17, Sep. 1989, pp. 1-17.

"MTOOL: A Method For Detecting Memory Bottlenecks," Goldberg et al., Digital Equipment Corporation Western Research Laboratory, Dec. 1990, pp. 1-15.

"On-Line Debugging Techniques: A Survey," Evans et al., Air Force Cambridge Research Laboratories, Fall Joint Computer Conference Proceedings, 1966, pp.37-50.

"Postloading for Fun and Profit," Johnson, S. C., Stardent Computer Corporation, USENIX, Winter, 1990, pp. 325-330.

Pure Software Purify 2, User's Guide.

"Rewriting Executable Files to Measure Program Behavior," Ball et al., Computer of Sciences-Department, University of Wisconsin-Madison, Computer Sciences Department, Mar. 1992, pp. 1-17.

"Runtime Checking for ISO Standard Pascal," Eggert, Paul R., IEEE Transactions on Software Engineering, vol. SE-7, No. 4, Jul. 1981, p. 447.

"Run-time Detection of Undefined Variables Considered Essential," Kempton et al., Software-Practice and Experience, vol. 20(4), Apr. 1990, pp. 391-402.

"Saber-C: An Interpreter-based Programming Environment for the C Language," Kaufer, et al., Saber Software, Inc., USENIX Conference Proceedings, Summer 1988, pp. 161-171.

"Some Requirements for Architectural Support of Software Debugging," Johnson, Mark Scott, Hewlett-Packard Laboratories, 1982, pp. 140-148.

"Systems for Late Code Modification," Wall, David W., Digital Equipment Corporation Western Research Laboratory, WRL Research Report 92/3, May 1992, pp. 1-19.

"The Bug Stops Here," Nichols, John L., Logical Services, Inc., Electronic Design, Jan. 1989, pp. 84, 86, 88 & 90.

"The Compatible Time-Sharing System," Crisman, P. A., The M.I.T. Computation Center, CTSS Programmer's Guide, Section AH.8.02, 1965, pp. 1-14.

"The diagnosis of mistakes in programmes on the EDSAC," Gill, S., Mathematical Laboratory, University of Cambridge, vol. 206, No. 1087, Dec. 1950, pp. 538-554.

"The Implementation of Run-Time Diagnostics in Pascal," Fischer et al., IEEE Transactions on Software Engineering, vol. SE-6, No. 4, Jul. 1980, pp. 313-319.

"Unassigned Objects," Winner, Robert I., Vanderbilt University, ACM Transactions on Programming Languages and Systems, vol. 6, No. 4, Oct. 1984, pp. 449-467.

"*Purify: Fast Detection of Memory leaks and Access Errors*", by Reed Hastings and Bob Joyce, Pure Software Inc. Proceedings of the Winter Usenix Conference, Jan., 1992.

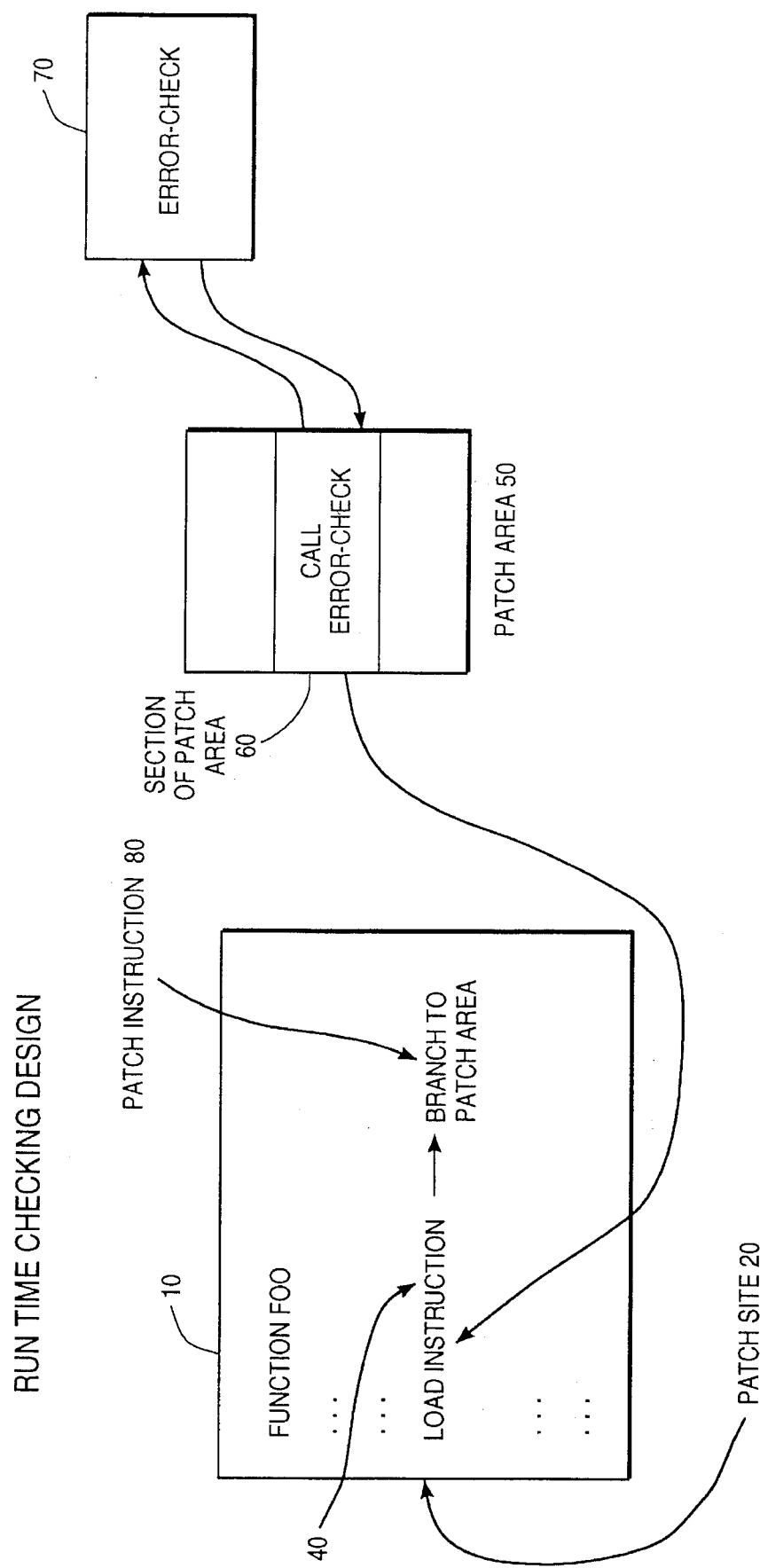

METHOD AND APPARATUS FOR RUN-TIME ERROR CHECKING USING DYNAMIC PATCHING

BACKGROUND OF THE INVENTION

1. Field of Invention

The present invention relates to the field of program error checking. More particularly, the present invention relates to a method and apparatus for run-time error checking using dynamic patching.

2. Background of the Invention

With the increase in size and sophistication of programs, the need for more flexible and sophisticated testing and debugging tools has also increased. Memory access related errors are one of the most important errors which must be monitored and rectified in the execution and development of programs. The current practice for testing and debugging programs is either to have the compiler output extra instructions for debugging purposes or to post-process the object files.

In the approach using the compiler to output extra instructions for debugging purposes, each type of patch desired is represented by a corresponding compiler flag whereby appropriate code is then inserted by the compiler. This approach of having the compiler output extra instructions for debugging purposes has major disadvantages including the need to recompile the program to insert the extra instructions.

The post-processing object files approach takes object files as input and writes out patched versions of these object files. After all of the object files for the executable program are modified, such patched versions of the object files are then linked together to form an executable program. The patching and linking is done before the program run-time.

There are additional drawbacks to the implementation and use of the prior art approaches. One disadvantage is the need for extra links to relink the files into the executable program once these files are patched. Another disadvantage is the inability to turn the patching on and off dynamically. In prior art approaches, if additional patching of a program is desired during program run-time, the entire process of patching, relinking and in the case of the compiler approach, the recompiling of the program is necessary. In other words, any additional patching requires one to start the whole process over. Yet another disadvantage to the prior art approaches is the inability to handle shared libraries. Not only do the libraries initially loaded with the program have to be patched, but additionally all the libraries that the program may or may not use subsequent to the initial loading of the program must all be patched. Finally, the disadvantages of the prior art approaches also include the need for separate versions of objects and libraries and the fact that the patch scope of the two prior art approaches do not cover a function or a line, but instead can only handle a file.

Additionally, both of the aforementioned prior art approaches utilize a static patching approach to patch the programs to be error checked. In this static patching approach, a program is pre-patched before execution, and such patching is done to the entire program and done only once for such program. All the libraries the program is using immediately as well as all the libraries the program may never use must also be known for pre-patching purposes. In addition, the patched objects must be relinked together, hence creating a need for extra links.

As will be described, the present invention provides a more flexible approach to debugging programs which overcomes the many disadvantages and limitations of the prior art.

BRIEF SUMMARY OF THE INVENTION

The invention provides a method and apparatus for dynamic patching for run-time error checking. With the present invention, a program to be error checked is read into memory where a debugging module resides. Such in-memory copy of the program is scanned for load objects. The load objects comprise libraries used by the program being error checked, as well as the main routines of the program. Next, a list of patch sites in the load objects is created and these patch sites correspond to address locations in the load objects to be patched. Address space is then allocated for sections of the patch area where calls to real checking code resides. Finally, patches are written out to the in-memory copy of the program to be error checked. The original instruction in a patch site is replaced with a branch to patch area instruction and the original instruction displaced is stored in the patch site's corresponding section of the patch area. The call to real checking code in this section of the patch area calls an error checking code. After the error checking is complete, the process transfers from the patch area to the next instruction in the segment of the patched load object. In addition, the present invention is able to load new load objects. Such new load objects are scanned and the aforementioned patching process is repeated for patching the new load objects.

The invention overcomes the many disadvantages and limitations of the prior art approaches. With the present invention, there is no need for pre-patching a program before execution. Instead, the patches may be applied when the checking is turned on, thereby delaying the choice of the user until the actual run-time. Furthermore, by not modifying the program source code at all and thus eliminating the need to relink the object files to produce the executable program, the approach of the present method avoids the use of extra links. Additionally, the present invention avoids the need to recompile the program to execute the error checking. Finally, the patches are applied to an in-memory copy of the existing program such that a fully instrumented program with checks built into such an instrumented program may be produced.

BRIEF DESCRIPTION OF THE DRAWINGS

FIG. 3 illustrates the present invention's dynamic patching for the run-time error checking method.

DETAILED DESCRIPTION OF THE INVENTION

Apparatus and methods for dynamic patching for run-time checking are disclosed. In the following description, for purposes of explanation, specific instruction calls, modules, etc., are set forth in order to provide a thorough understanding of the present invention. However, it will be apparent to one skilled in the art that the present invention may be practiced without these specific details. In other instances, well known circuits and devices are shown in block diagram form in order not to obscure the present invention unnecessarily.

The present invention utilizes dynamic patching to check for program errors during program run-time which are not detected by the compiler. Such run-time errors are checked by patching the program such that at every point where the program is about to access memory, the program instead branches to a different location where checks on the memory address that is about to be accessed are performed. If the memory address that the program is about to access is invalid, an error is recorded, otherwise if the memory address is valid then the program will continue execution. The actual patching process is done inside a debugger.

Figure 1:
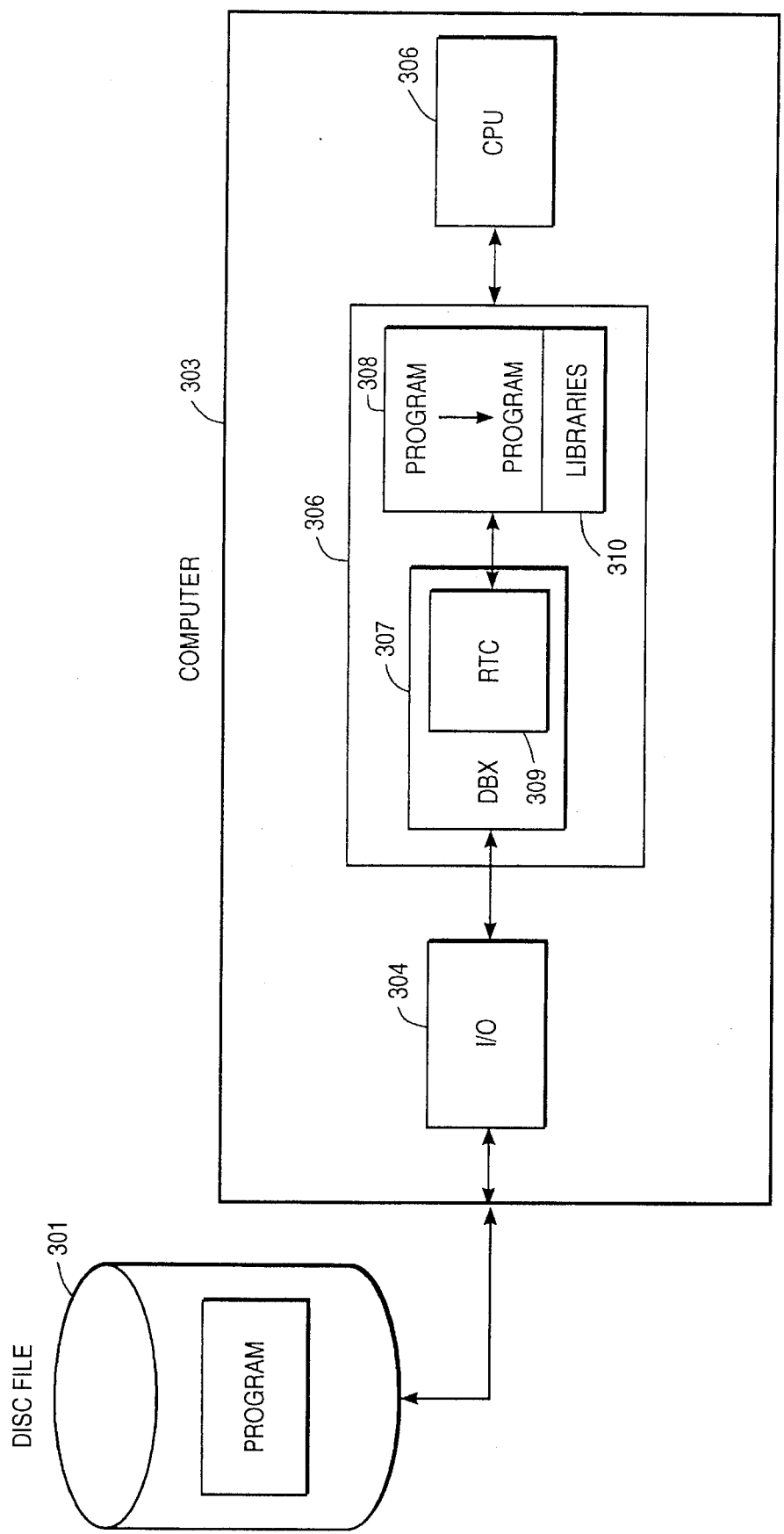
FIG. 1 is a computer block diagram of the run-time error checking system using dynamic patching.

FIG. 1 is a system block diagram for a computer system with run-time error checking using dynamic patching. It will be appreciated that the computer system illustrated in FIG. 1 is shown in conceptual form, and that many additional circuits, devices and interconnections of the computer system are not shown in order to not obscure the present invention.

As shown in FIG. 1, a program image is read into a debugger program 307 (dbx) through an I/O device 304, and stored in memory to provide an in-memory copy 308 of a program 302. A module within the debugger program 307 referred to as a "run-time checking" (RTC) module 309 handles the user interface, printing of error messages and also handles the patching of the in-memory copy 308 of a program 302. A shared library (Libraries) module 310 is loaded into the program 302, and performs the run-time checking. This in-memory copy of the program 302 changes to a patched program, called "instrumented program" herein. The patches are applied only to this in-memory copy 308 of the program 302 and not to the original program 302 stored on disk 301. Therefore, the original file 302 never changes and there is never any relinking of the file required for the executable program. In addition, the program 302 does not have to be pre-patched. Instead, the patches are applied when the checking is initiated. The choice by the user is therefore delayed until the actual run-time rather than before execution.

Furthermore, the debugger program 307 can dynamically load libraries at run-time that were not specified at load time. Since such loading of libraries is done dynamically in the debugger program 307, the RTC module 309 can trap all calls to load a new library in the program and may apply patches just before such libraries are loaded. As such, the new libraries are also patched.

In sum, with the present invention there is no necessity for pre-patching a program before execution. Instead, the patches may be applied when the checking is initiated, thereby delaying the choice of the user until the actual run-time. Furthermore, by not modifying the program source code at all and thus eliminating the need to relink the object files to produce the executable program, the approach of the present method avoids the use of extra links. Finally, the patches are applied to an in-memory copy of the existing program such that a fully instrumented program with checks built into such instrumented program is produced.

Figure 2:
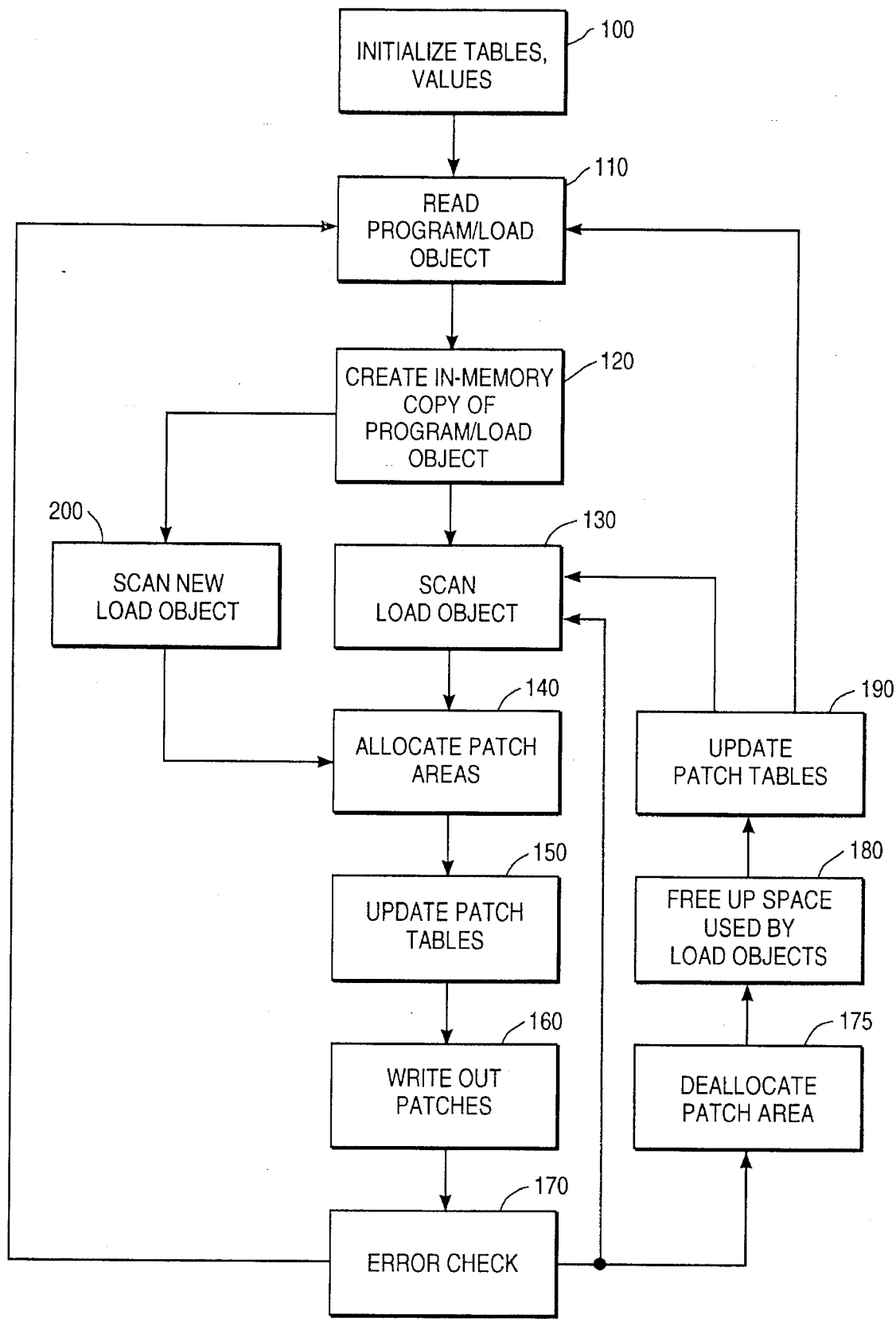
FIG. 2 is a general flow chart of the present invention's dynamic patching for the run-time error checking.

Reference is now made to FIG. 2, wherein a general flow chart for the method of dynamic patching for the run-time checking is illustrated. In order to detect memory access errors, all memory access instructions, including accesses to the stack and system calls that access user memory are intercepted. Such memory access instructions are then verified as to validity of memory address being accessed before continuing instruction execution.

For such error checking, the present invention disassembles the functions that are being checked. Next, the locations that need to be patched are identified as patch sites. Furthermore, the original instructions at these patch sites are then replaced by a branch to patch area instruction.

As illustrated in FIG. 2, block 100, space is allocated for the patch tables and the patch tables and values are initialized. Next, as illustrated in block 110, the program to be error checked is initially read and loaded as it exists on the disk file. Such program is normally loaded in portions (load objects) as they are accessed by the user. However, by going through the steps illustrated in FIG. 2, the debugger will cause essentially all of the program to be accessed. Thus, as a result, when the debugger program has completed its processes, all of the program will have been patched. This debugger program is a special process that is able to read and write other processes and therefore able to change the program image that is within the memory. All operations described within FIG. 2 are performed by the RTC module within the debugger program.

As can be appreciated by FIG. 2, block 130, the debugger program creates a list of load objects. The load objects contain segments/functions within the program which have memory access instructions. The program consists of a number of these load objects. The first type of load object is the program's main routine, which is the user part of the program. There are also shared libraries that the program uses, which are another type of load object. Both types of load objects are required in order to run the program. Once the debugger program has received a list of the load objects, it will scan the load objects, searching for instructions that it is going to patch later on. The only part of the load object the debugger program looks at during this instruction-by-instruction scan are the instructions themselves, i.e., the text, but not the data.

While the debugger program is identifying the patch sites, the debugger program also accumulates information regarding these patch sites, including patch site address, patch area address, patch type (i.e. memory access instruction type), whether a particular patch site should be patched, and the size of memory being accessed. Every load object has a table for the aforementioned patch site information, with one entry in the table for each patch site. The patch type or the type of memory access instruction for patching purposes defines the size of its corresponding section of patch area where the error checking is processed. A check command or uncheck command issued by a user for a particular patch site will indicate whether or not that particular patch site is to be patched. More specifically, the check command indicates that the particular patch site should be error checked and the uncheck command conversely indicates that the particular patch site should not be error checked. At the very end of the scan, the debugger program comes up with a total size of the section of patch area that the debugger program is going to need in order to accommodate the patch sites found. The identification of a patch site only needs to be done once for a load object and any subsequent run only requires locating a space for the corresponding section of the patch area space and installing the patch. The total size needed for the patch area sections is recorded and a list of the patch area section sizes is produced. This list of patch area section sizes is the input to the next step, step 140, in which memory space is actually allocated to the patch area.

In step 140, the debugger program takes the list of patch area section sizes and attempts to allocate space for them. The debugger program first creates an initial map of the address space to see where everything is laid out. The system maps the load objects in various places in memory. Such mapping of load objects is not necessarily contiguous and there are holes in the address space. The job of the debugger program is to identify these holes and to map these lists of requests for space needed to these holes.

In one embodiment of the invention, the address space data is accessed to obtain a list of all segments in the address space along with each segment's starting address and size. These segments may consist of text, data, stack and/or heap segments. The space between such segments, called "holes" herein, are used to allocate space for the sections of the patch area. A list containing the starting address of each text segment, ending address of each text segment and the size of sections of the patch area, sorted by ascending order of the starting address of each text segment, is obtained from the previous step 130. In step 140, a list of holes with starting addresses and segment sizes of the holes sorted by starting address of each hole is generated.

The aforementioned holes are compared to the sizes of sections of the patch area needed by first checking for holes with address locations higher than the patch sites for the corresponding sections of the patch area. Given a hole with a size larger than the size of the section of the patch area for which space is to be allocated and the hole is not immediately before a stack segment, then the section of the patch area is allocated the hole space. After going through the list of the patch area section sizes and the list of the holes and allocating the holes to the sections of the patch area, the list of unallocated patch area sections produced will be scanned in descending order. The holes at lower addresses than the patch sites which are greater than or equal to the corresponding sections of the patch area are searched. The holes which are greater than or equal to particular section of the patch area are allocated to that section of the patch area. Such section of the patch area is placed at the bottom of the hole. Any patch sites for which its corresponding section of patch area is not allocated at the end of this step is not patched and the user will be warned that the request for error check was not met.

In step 150, the system takes the information of where it found all the sections of the patch area and stores that information in the patch table and updates the address information in these patch tables.

In step 160, spaces for sections of the patch area are allocated and all the instructions in the original program that need to be patched are identified. Now the patches actually get written out at this stage and at the completion of this stage the program is completely transformed to a fully instrumented program. The table of data containing the patch site information, as described previously (i.e., containing the patch site address, the patch area address, the patch type, whether the patch site is to be patched, and the size of memory being referenced), is used to determine the patch sites. If the pages containing the patch site and the corresponding section of the patch area have not been read, they are read and the patch type is written out into the corresponding section of the patch area. The original instruction in the patch site is replaced with a branch instruction to the corresponding section of the patch area, and such displaced original instruction is placed in the corresponding section of the patch area. This patching is done unless an uncheck command is issued for this particular patch site. If on the other hand an uncheck command is issued for this particular patch site, then that particular patch site will not be patched. There will be no inconsistent state while patching since the sections of the patch area are written before the patch sites are updated. Any interrupts in a load object are blocked during the patching, and unblocked for servicing between patching of a load object, ensuring that a load object is either patched correctly or not patched at all. Issuing of a check command by the user during the time the program is active will not enable the patching of any load object active on the stack at that time. However, an uncheck command issued while the program is active will cause the patch to be de-installed in a load object. This step completes the initial patching implemented on a program as the program is about to run. Essentially, all the steps illustrated in FIG. 2 from steps 100 to 160 are performed when the user wishes to run the program within the debugger program. In sum, steps 100 through 160 completes the patching for all the load objects that exist at the time the program is started.

In addition, the debugger program is able to load new load objects dynamically which were not in the program at the time the program was started. The system traps all calls to new load objects, and when the debugger program sees that a program is about to load a new object, the debugger program goes through a similar set of steps. The steps 110, 120, 200, 140, 150, 160 and 170 illustrate dynamic loading of a new load object. The steps are identical to the previously followed steps except there is no initialization. The global initialization is performed once only and then these steps are performed for each new load object that are dynamically loaded.

As illustrated in steps 175, 180 and 185 the debugger program is able to also de-install the patches and dynamically unload load objects. In step 175, the uncheck operation triggers the de-installation of patches at either segments, modules, functions or for instructions. Given a patched function, the page containing the patch site to be de-installed as well as the page containing the corresponding section of the patch area are read. The original instruction is then obtained from the section of the patch area and the branch to patch area instruction in the patch site is replaced by this original instruction. In addition to this replacement of the patch instruction in the patch site, user breakpoints at these patch sites will require replacing the patch instruction in the breakpoint data structure associated with the patch site as well. In the event that the patch site was not patched, a warning is issued to the user and nothing is de-installed. The user issuing the check command will merely replace the instruction at the patch site with the branch to patch area instruction.

In step 180, at the programmer's option, space allocated the load object may be deallocated. The dynamic deallocation is done in order to save address space. If a large number of new load objects are being loaded in, there may not be any empty address space. Given a module that is no longer needed, it may be more advantageous to deallocate such space for potential use.

Finally, in step 190, the patch tables are updated with the information on the deallocated sections of the patch area.

FIG. 3 illustrates the dynamic patching for the run-time error checking method used in the present invention. A program consists of a number of load objects and in turn the load objects contain a number of functions, and function 10 as function foo, is one example. Such function will have a number of memory access-related instructions. One such instruction is illustrated as load instruction 40. The run-time checking (RTC) module will patch each and every such instruction for every load object that it is patching. This run-time checking (RTC) module scans each and every individual instruction that needs to be patched, as was illustrated by Box 130 of FIG. 2, and the original instructions are then replaced by unconditional branch instructions to the patch area. The location of the instruction that is patched is called "the patch site" 20. Therefore, if there was a load instruction at a location within a load object then that location would be called "a patch site" 20. The memory location where the error checking is done is called "the patch area" 50. For each section of the patch area 60, there will be a unique patch site. Therefore if there are 1,000 patch sites, there will be 1,000 sections of the patch area.

For each instruction that is replaced within the load object, there is an instruction to branch to the corresponding section of the patch area 60. Thus, there is a custom section of the patch area 50 that is assigned to the whole load object for each patch site 20 and each patch site 20 is replaced with a branch to its own custom section in the patch area 50. These sections of the patch area 60 consist of several instructions which are basically set up to call some real checking codes 70 in a separate area in memory. Thus, a checking code is called from the patch area 50 which performs the checks. If there are any errors to report, the debugger program will report them, otherwise the process is returned to the patch area 50 and in turn the process is returned to the next instruction that will be executed in the user program.

There are different types of sections of the patch area depending upon the types of instruction being patched. There are also several different kinds of cases due to delayed branch instructions that have to be handled separately. Therefore sections of the patch area are not identical. In sum, a section of the patch area is specifically for one particular patch. FIG. 3 illustrates a process in which patch sites are replaced by branches to a section of the patch area and a further branch to a checking code and back to the next instruction to be executed in the user program. There are other cases that may modify the illustration in FIG. 3. For example, if an instruction to be patched was in a delay slot of a branch, i.e., a delayed branch instruction, then after branching to the patch area and the checking code, the process should branch to the address location the process was supposed to branch to prior to the error checking instead of branching back to the next instruction in sequence.

While certain exemplary embodiments have been described in detail and shown in the accompanying drawings it is to be understood that such embodiments are merely illustrative of and not restrictive on the broad invention, and that this invention not be limited to the specific arrangements and constructions shown and described, since various other modifications may occur to those ordinarily skilled in the art.

What is claimed is:

1. A computer implemented method for providing dynamic patching of machine instructions for a target computer program process in order to provide run-time error checking of memory accesses made by said target computer program process, said method comprising the steps of:

under control of a debugger program, reading a target computer program into a test and initiating an in-memory process representing said target computer program;

scanning a designated portion of machine instructions of the in-memory process representing the target computer program and marking each machine instruction in the designated portion which contains a memory access command as a patch site;

finding available memory-space in the test computer and designating a patch-area in such available memory-space corresponding to each patch site, wherein machine instructions are provided in the patch-area to call a memory-access status module for testing validity of the memory access command associated with each patch site;

replacing the memory-access command in the machine instruction at each patch site with a transfer instruction to a corresponding patch-area associated with the memory-access command, wherein the replaced memory-access command will be executed after the memory-access status module has caused the memory access command to be tested for validity; and transferring operating control to the target computer program process which has been patched for memory-access checking, whereby each memory access will be checked for validity before the memory-access command is executed by the target computer program process.

2. The method of claim 1 further comprising the step of initializing patch tables and values.

3. The method of claim 1 further comprising the step of scanning said program for load objects, said load objects comprising libraries used by said program and main routines of said program.

4. The method of claim 3 further comprising the steps of:

creating a list of patch sites corresponding to address locations to be patched in said load objects;

allocating an address space for sections of patch area, said sections of patch area comprising calls to real checking code; and storing address locations for said sections of patch area in patch tables.

5. The method of claim 4 further comprising the step of creating a list of sizes of patch area sections.

6. The method of claim 5 wherein said step of allocating address space for said patch area further comprises the step of accepting said list of sizes of patch area sections for said load objects.

7. The method of claim 4 wherein said step of allocating address space for said sections of patch area further comprises the step of mapping said sections of patch area to empty address space in memory.

8. The method of claim 7 further comprising the step of identifying empty address locations in said memory.

9. The method of claim 4 wherein said step of storing address locations for said sections of patch area in said patch tables further comprises the step of updating said patch tables with new patch area section addresses.

10. The method of claim 4 further comprising the steps of:

on completion of memory access checking and on command from the debugger program, unloading an original instruction from said sections of patch area, where said original instruction is a memory access command which was previously replaced with a transfer instruction and the memory access command moved to the patch area;

replacing said transfer to patch area instruction in said patch site with said original instruction;

deallocating unloaded patch area section space; and updating said patch tables.

11. A system for providing dynamic patching of machine instructions for a target computer program process in order to provide run-time error checking of memory accesses made by said target computer program process, said system comprising:

an input and output element for creating an in-memory copy of a target computer program;

a debugging control mechanism coupled to said input and output element, for creating an in-memory process corresponding to the target computer program;

a scanning element coupled to and controlled by said debugging control mechanism for scanning a designated portion of machine instructions of the in-memory process representing the target computer program and marking each machine instruction in the designated portion which contains a memory access command as a patch site;

a memory management mechanism coupled to said debugging control mechanism for finding available memory-space in the test computer and designating a patch-area in such available memory-space corresponding to each patch site wherein machine instructions are provided in the patch-area to call a memory-access status module for testing validity of the memory access command associated with each patch site;

a patching element coupled to said debugging control mechanism for replacing the memory-access command in the machine instruction at each patch site with a transfer instruction to a corresponding patch-area associated with the memory-access command, wherein the replaced memory-access command will be executed after the memory-access status module has caused the memory access command to be tested for validity; and an execution element under control of said debugging control mechanism for transferring operating control to the target computer program process which has been patched for memory-access checking, whereby each memory access will be checked for validity before the memory-access command is executed by the target computer program process.

12. The system of claim 11 wherein said memory management mechanism further comprises memory mechanisms for maintaining:

patch tables and values;

a patch area section of memory, said patch area section coupled to unique patch sites identified in the in-memory process representing the target computer program; and an error checking element, said error checking element coupled to each of said patch area sections for use in checking for memory access errors.

* * * * *